United States Patent [19]
Anderson

[11] 3,734,223
[45] May 22, 1973

[54] VEHICLE FRAME AND INTERCHANGEABLE COMPONENTS

[76] Inventor: Leonard E. Anderson, Box 31, Roland, Iowa 50236

[22] Filed: June 29, 1971

[21] Appl. No.: 157,984

[52] U.S. Cl..............180/64 L, 180/89 R, 296/35 R
[51] Int. Cl. ...............................................B60k 5/10
[58] Field of Search.................180/1 R, 54 R, 64 R, 180/64 L, 84 R; 296/1 R, 28 C, 35 R, 35 A

[56] References Cited

UNITED STATES PATENTS

| | | | |
|---|---|---|---|
| 2,831,544 | 4/1958 | Dunn et al. | 180/9.24 R |
| 3,451,571 | 6/1969 | Brisson | 180/64 L X |
| 3,036,652 | 5/1962 | Barenyi | 180/54 R |
| 3,570,614 | 3/1971 | Bagno | 180/89 |
| 2,322,477 | 6/1943 | Sjoberg | 180/64 L X |
| 1,126,592 | 1/1915 | Twombly | 180/64 L |
| 1,313,429 | 8/1919 | Lenfestey | 180/64 R |

FOREIGN PATENTS OR APPLICATIONS

| | | | |
|---|---|---|---|
| 538,905 | 6/1955 | Belgium | 180/54 R |
| 585,115 | 11/1958 | Italy | 180/54 R |
| 787,815 | 12/1957 | Great Britain | 180/54 R |

*Primary Examiner*—Leo Friaglia
*Assistant Examiner*—Leslie J. Paperner
*Attorney*—Zarley, McKee & Thomte

[57] ABSTRACT

The present invention includes an elongated wheel-supported frame having forward and rearward ends. A motor unit is mounted on the frame by means of a bracket which slidably connects the unit to the frame for selective sliding movement forwardly and rearwardly on the frame. Locking pins are provided for locking the motor unit against sliding movement on the frame. Other brackets are slidably mounted on the frame for movably mounting other working components to the frame.

4 Claims, 7 Drawing Figures

INVENTOR
LEONARD E. ANDERSON
BY
Zarley, McKee & Thomte
ATTORNEYS

INVENTOR
LEONARD E. ANDERSON

VEHICLE FRAME AND INTERCHANGEABLE COMPONENTS

This invention relates to vehicles and more particularly to vehicles having one or more working implements mounted thereon. Much heavy-duty equipment is presently being mounted on vehicular frames so that it can be transported from one job to another. Presently the implements to be used are permanently mounted on the vehicular frames, thereby requiring a separate vehicle for each work implement. Also in present devices the motor unit is permanently mounted to the frame and is not movable thereon to accomodate varying types of components on the vehicle frame.

Therefore, a primary object of the present invention is the provision of a versatile vehicle which is capable of having a motor unit and a plurality of working units movably and removably mounted thereon.

A further object of the present invention is the provision of a vehicle wherein the motor unit can be slidably moved from beneath the vehicle cab for inspection, servicing, replacement, or repair in a minimum amount of time.

A further object of the present invention is the provision of a vehicle wherein the motor unit and the cab can be moved to any position desired along the length of the vehicle frame.

A further object of the present invention is the provision of a vehicle wherein brackets are movably mounted on the vehicle frame for mounting working units thereon.

A further object of the present invention is the provision of a vehicle having a removable drive shaft interconnecting the motor unit and the wheels which can be removed and replaced by drive shafts of varying lengths so as to permit the motor unit to drive the vehicle even when the motor unit is moved to a plurality of positions along the vehicle frame.

A further object of the present invention is the provision of a vehicle which is economical to manufacture and durable in use.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings in which:

Figure 3:
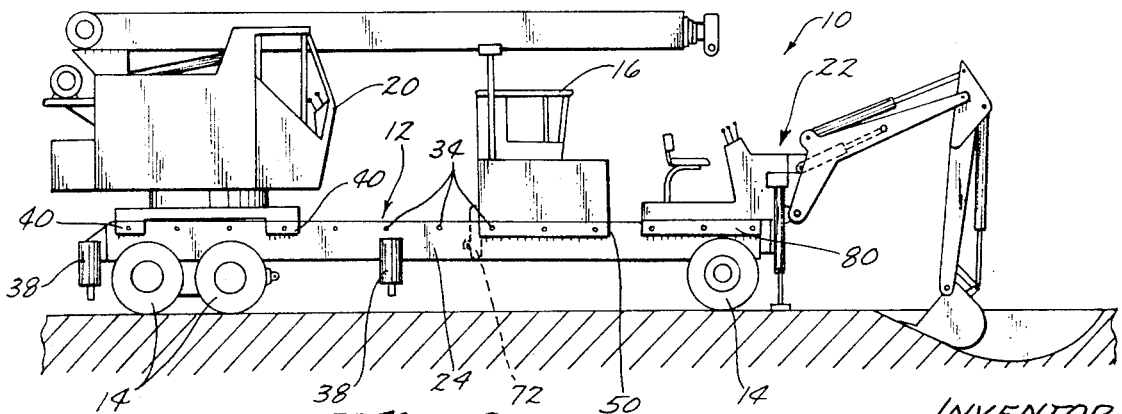
FIG. 3 is a view similar to FIG. 1 and FIG. 2 and showing the cab unit, the crane unit and a digging unit in a configuration different from FIG. 1 and FIG. 2.

Referring to the drawings, a vehicle 10 includes a frame 12, a plurality of wheels 14, a cab unit 16, a motor unit 18 mounted beneath cab unit 16, a crane unit 20, and a digging unit 22 (FIG. 3). The particular arrangement of wheels 14 is unimportant to the invention and the wheels may be arranged in tandem at both ends of vehicle 10 or (as shown in the drawings) at only one end of vehicle 10. Frame 12 includes two parallel beams 24 which are C-shaped in cross section (FIG. 6 - 7) and which include a vertical web 26 having horizontal flanges 28 at its upper and lower edges. The open faces formed by the C-shape of the parallel beams are presented inwardly, and a plurality of reinforcing plates 30 (FIG. 5 - 7) are welded across the open ends of the cross sectional C's at a plurality of points along the lengths of beams 24. A plurality of cross beams 32 extend between and are welded to parallel beams 24. Each vertical web 26 of beams 24 is provided with a plurality of locking holes 34 along its length. Similar locking holes 36 (FIG. 6) are provided in reinforcing plates 30 in registered alignment with locking holes 34. Mounted at a plurality of points along the lengths of beams 24 are a plurality of support legs 38 which are adapted to be extended to engage the ground and stabilize vehicle 10 during the use of such components as crane unit 20.

Figure 7:
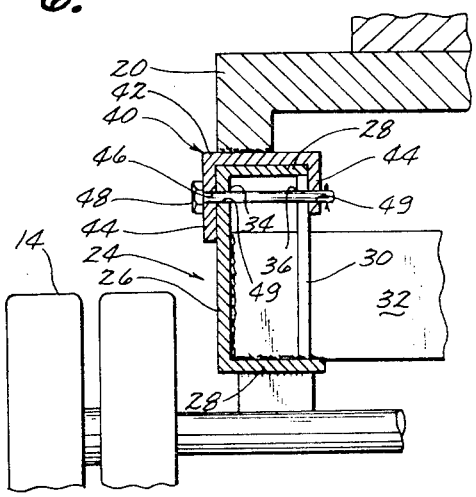
FIG. 7 is a sectional view taken along lines 7 — 7 of FIG. 4.

Crane unit 20 is mounted on frame 12 by means of crane mounting brackets 40. Referring to FIG. 7, each crane mounting bracket 40 includes a horizontal web 42 which is welded to the undersurface of crane 20 and which includes a pair of downwardly extending legs 44 which slidably embrace beam 24 in saddle-like fashion. Legs 44 include apertures 46 therein which are adapted to register with apertures 34 in beam 24. A locking pin 48 extends through apertures 46, 34 so as to lock crane mounting brackets 40 against sliding movement on beam 24. Reinforcing plates 30 also include apertures 49 therein which are in registered alignment with apertures 46, 34 so as to receive pin 48.

Figure 4:
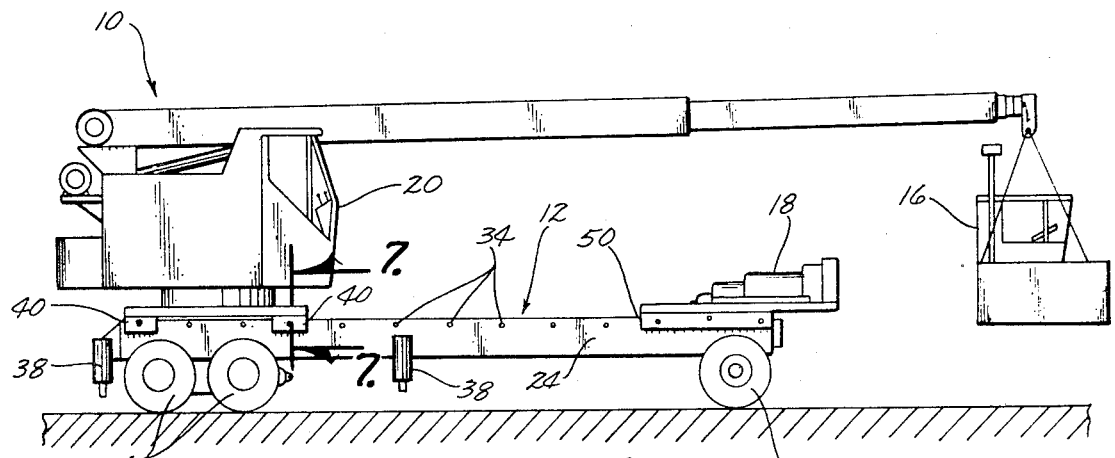
FIG. 4 is a view similar to FIGS. 1 - 3 and showing the motor unit with the cab unit removed therefrom.
Figure 5:
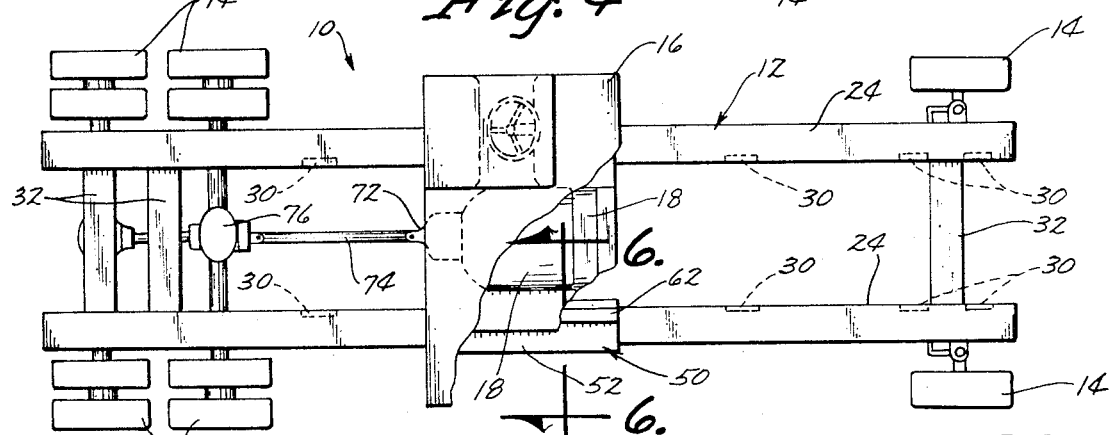
FIG. 5 is a top view of the vehicle with only the cab and motor units thereon.
Figure 6:
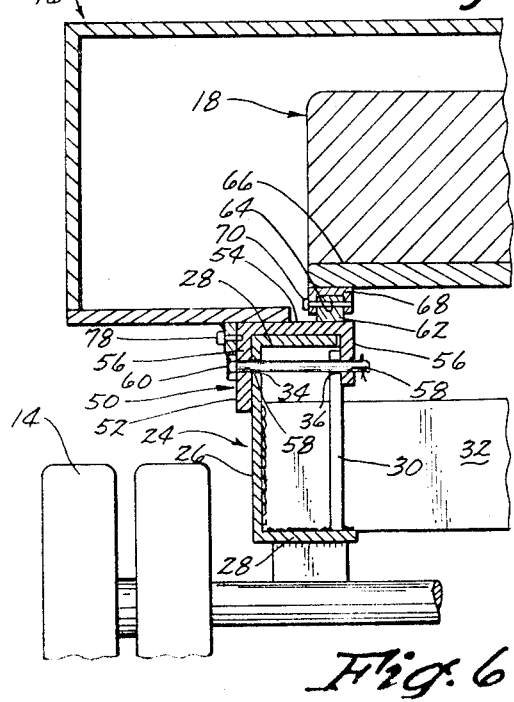
FIG. 6 is a sectional view taken along lines 6 — 6 of FIG. 5.

Referring to FIG. 4 - 6, motor unit 18 is movably mounted on frame 12 by means of a pair of motor mounting brackets 50. Each bracket 50 includes an elongated member 52 having a U-shaped configuration in cross section formed by a horizontal web 54 and two downwardly extending legs 56. Legs 56 are provided with apertures 58 therein which are adapted to register with apertures 34 of beams 24. A lock pin 60 is adapted to extend through apertures 58, 34 so as to lock motor mounting brackets 50 against longitudinal sliding movement on beams 24. Mounted on the upper surface of web 54 of motor mounting bracket 50 is a longitudinal slide rail 62 which extends along a line parallel to the longitudinal axis of beams 24. Each slide rail 62 includes several cross bores 64 extending transversely therethrough. Motor unit 18 is mounted upon a frame 66 having U-shaped channels 68 mounted on the lower surface thereof. Channels 68 are downwardly presented and are slidably mounted over slide rail 62 for sliding movement there along. U-shaped channels 68 are provided with apertures which align with cross bores 64 of slide rails 62 and which are adapted to receive lock pins 70 for locking them against sliding movement on slide rails 62.

Figure 1:
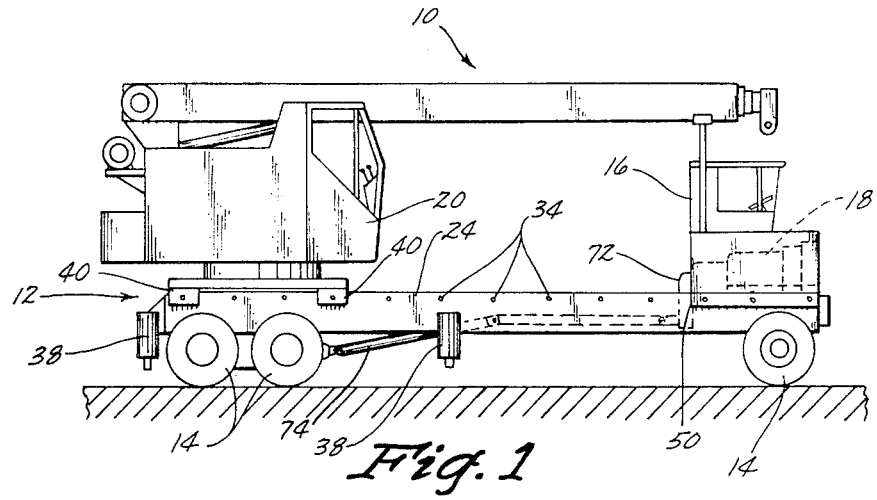
FIG. 1 is a side view of the vehicle of the present invention.
Figure 2:
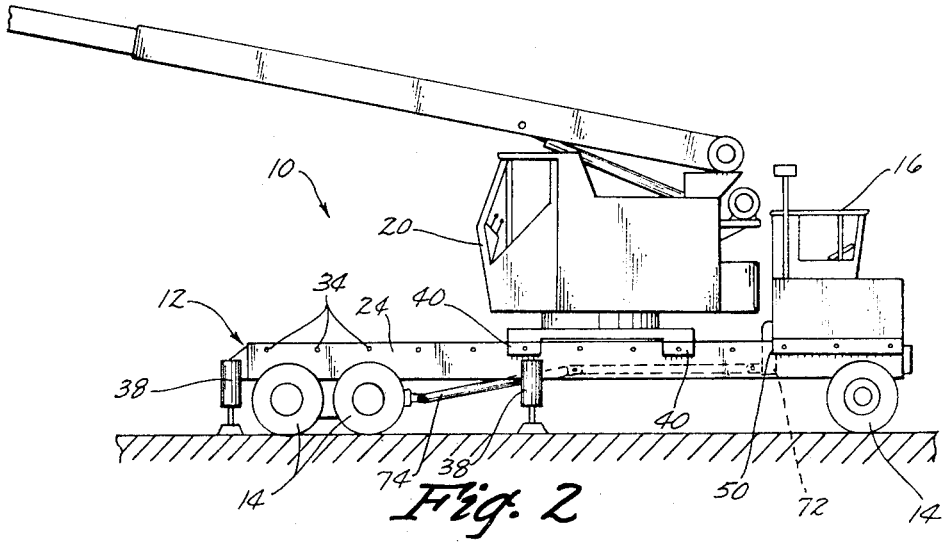
FIG. 2 is a view similar to FIG. 1 showing the crane unit to be moved to a different position.

Motor unit 18 includes a gear box 72 (FIGS. 1, 2 & 5). Extending rearwardly from gear box 72 is a drive shaft 74 which is drivingly connected to a differential 76 for driving the rear wheels 14. Drive shaft 74 is removable so that it can be replaced with shorter or longer shafts to accommodate movement of motor unit 18 along the lengths of frame 12.

Referring to FIG. 6, cab unit 16 is mounted on motor mounting brackets 50 by means of a bolt 78 or other conventional securing means so that cab unit 16 is detachably secured to brackets 50.

In operation, cab unit 16 is detachably mounted on motor mounting brackets 50 so that it will slide forwardly and rearwardly in unison with brackets 50. Brackets 50 are slid to the desired position and locking pins 60 are inserted in place to prevent the bracket 50 from further movement. Thus cab 16 can be positioned either as shown in FIG. 1, or it may be moved rearwardly to positions such as shown in FIGS. 3 & 5. Motor unit 18 is normally secured to motor mounting brackets 50 by pins 70 as shown in FIG. 6. Thus motor unit 18 is mounted beneath cab 16 (see FIG. 1) and moves in unison with cab 16 to the desired position on frame 12. In the event that motor unit 18 requires servicing or repair, pins 70 are removed and motor unit 18 may be slid forward longitudinally to the position shown in FIG. 4 so as to expose the undersurface of the motor unit 18 for servicing.

The crane unit 20 is also movable longitudinally on frame 12 by virtue of crane mounting brackets 40. Locking pins 48 are removed from crane mounting brackets 40 and crane 20 is slid to the desired position. Thus crane 20 may be positioned at the rear of the vehicle as shown in FIG. 1 or it may be slid forwardly to a position such as that shown in FIG. 2. It is merely locked in place by reinserting pins 48.

Referring to FIG. 3, digging unit 22 is mounted on vehicle 10 by means of additional brackets 80 which are similar in construction to motor mounting brackets 50 described above. Brackets 80 are rigidly secured to the undersurface of digging unit 22. It can be seen that any of a number of components may be added to or moved along frame 12 merely by providing brackets such as brackets 40, 50 and 80 on the undersurface of the component.

I claim:
1. A vehicle comprising,
an elongated wheel supported frame having forward and rearward ends;
a motor unit;
first mounting means on said frame assembly slidably connecting said motor unit to said frame for selective sliding movement forwardly and rearwardly on said frame,
first locking means on said first mounting means for selectivly locking said motor unit on said frame to hold said motor unit against sliding movement thereon, and
a cab operatively secured to said first mounting means and being movable in unison with said motor unit so that said motor unit and said cab can be selectively positioned along the length of said frame.

2. A vehicle according to claim 1 wherein said frame comprises a parallel pair of longitudinally extending members, said mounting means comprising a mounting bracket operatively connected to said motor unit and slidably mounted on said pair of longitudinally extending members, said cab being operatively detachably secured to said mounting bracket to permit said cab to be selectively removed from said motor unit.

3. A vehicle according to claim 1 wherein a first unit having working implements thereon is removably mounted on said frame, said motor unit and said cab being selectively positioned on said frame in response to the position of said first unit on said frame.

4. A vehicle according to claim 3 wherein said motor unit is selectively slidably secured to said mounting bracket to permit said motor unit to be moved longitudinally outwardly from one end of said frame so that the underside of said motor unit will be exposed.

* * * * *